United States Patent
Votaw et al.

(10) Patent No.: US 9,942,238 B2
(45) Date of Patent: Apr. 10, 2018

(54) CONFIGURING ACCESS TO ONLINE ACCOUNTS FOR THIRD PARTIES NOT ASSOCIATED WITH THE ONLINE ACCOUNT

(71) Applicant: Bank of America Corporation, Charlotte, NC (US)

(72) Inventors: Elizabeth S. Votaw, Potomac, MD (US); William B. Belchee, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 185 days.

(21) Appl. No.: 14/839,184

(22) Filed: Aug. 28, 2015

(65) Prior Publication Data

US 2017/0063866 A1    Mar. 2, 2017

(51) Int. Cl.
*H04L 29/06* (2006.01)
*H04L 29/08* (2006.01)
*G06F 21/45* (2013.01)
*G06F 21/41* (2013.01)
*G06F 21/62* (2013.01)

(52) U.S. Cl.
CPC ............ *H04L 63/102* (2013.01); *G06F 21/41* (2013.01); *G06F 21/45* (2013.01); *G06F 21/629* (2013.01); *H04L 63/08* (2013.01); *H04L 63/205* (2013.01); *H04L 67/02* (2013.01); *H04L 67/306* (2013.01)

(58) Field of Classification Search
CPC ..... H04L 63/08; H04L 63/102; H04L 63/205; G06F 21/45
See application file for complete search history.

(56) References Cited

U.S. PATENT DOCUMENTS

| | | | |
|---|---|---|---|
| 7,552,467 B2 | 6/2009 | Lindsay | |
| 7,577,659 B2 | 8/2009 | Schutz et al. | |
| 7,810,143 B2 | 10/2010 | Ruzyski et al. | |
| 7,848,974 B1 | 12/2010 | Sheehan | |
| 7,870,072 B1 | 1/2011 | Dennes et al. | |
| 7,890,393 B2 * | 2/2011 | Talbert | G06Q 20/04 705/35 |
| 8,001,045 B1 | 8/2011 | McClinton | |
| 8,266,306 B2 | 9/2012 | Newstadt et al. | |
| 8,301,900 B1 * | 10/2012 | Juang | G06F 21/46 713/184 |
| 8,336,091 B2 | 12/2012 | Wong | |
| 8,341,082 B1 | 12/2012 | Dennes et al. | |
| 8,424,077 B2 | 4/2013 | Adams et al. | |

(Continued)

Primary Examiner — Khoi Le
(74) Attorney, Agent, or Firm — Michael A. Springs

(57) ABSTRACT

According to one embodiment, a system includes a memory comprising instructions, an interface, and a processor communicatively coupled to the memory and the interface. The interface is configured to receive, from a first user associated with an online account, a first request to allow access, by a second user not associated with the online account, to the online account, send, in response to the first request, a second request to the second user for credentials, and receive, in response to the second request, credentials from the second user. The process is configured, when executing the instructions, to generate, for the online account based on the first and the credentials received from the second user, an access profile associated with the second user.

9 Claims, 4 Drawing Sheets

(56) References Cited

U.S. PATENT DOCUMENTS

| | | | |
|---|---|---|---|
| 8,544,072 B1* | 9/2013 | Masone | H04L 63/0815 |
| | | | 726/10 |
| 8,572,709 B2 | 10/2013 | Hockings et al. | |
| 8,683,566 B1* | 3/2014 | Gailloux | G06F 21/31 |
| | | | 726/3 |
| 8,752,154 B2 | 6/2014 | Kelley | |
| 9,418,213 B1* | 8/2016 | Roth | G06F 21/31 |

* cited by examiner

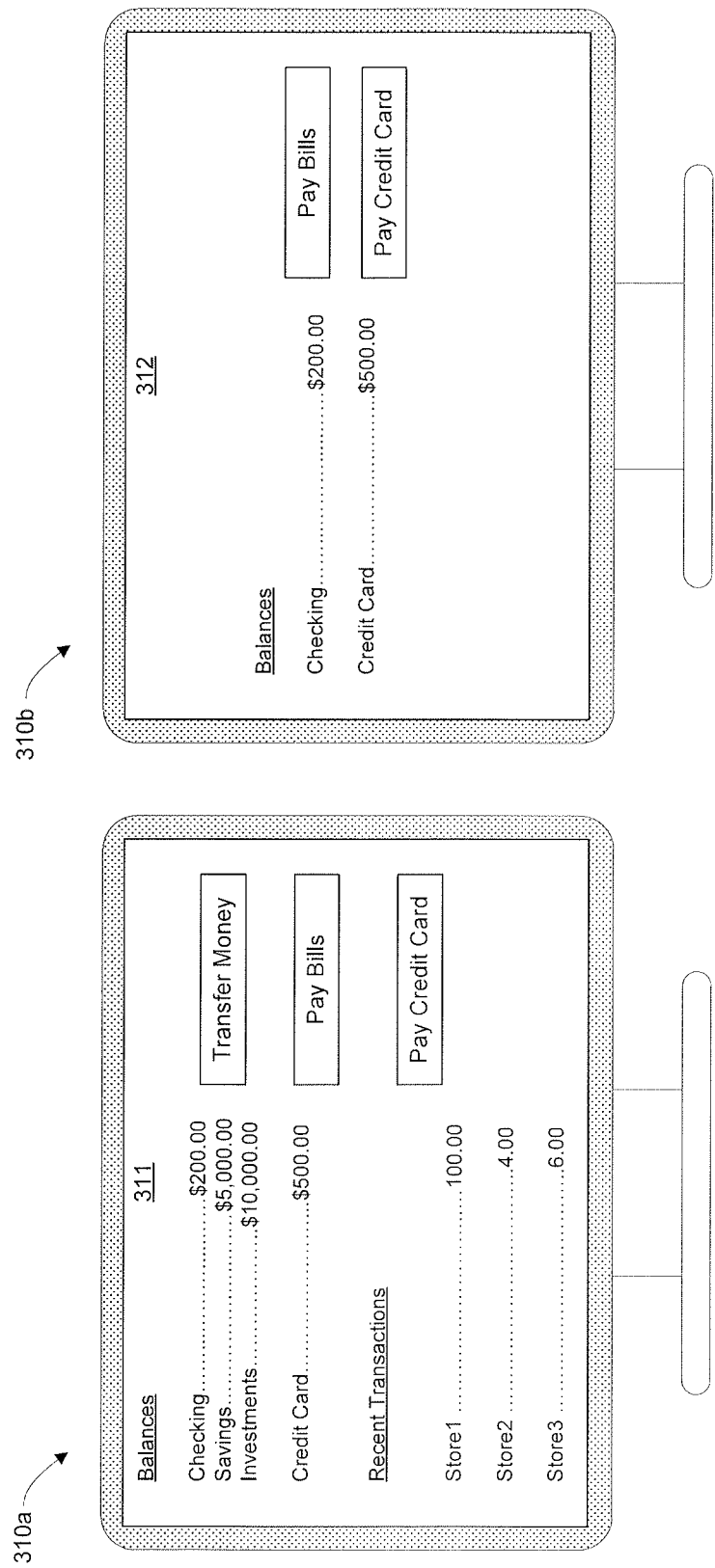

CONFIGURING ACCESS TO ONLINE ACCOUNTS FOR THIRD PARTIES NOT ASSOCIATED WITH THE ONLINE ACCOUNT

TECHNICAL FIELD

This disclosure relates generally to online account security, and more particularly to configuring access to online accounts for third parties not associated with the online account.

BACKGROUND

Typically, online accounts may be accessed only by the owner of the account or agents of the company that provides the online account. In certain situations, however, an account owner may wish to allow third parties to access information in the online account or perform functions associated with the online account on behalf of the account owner.

SUMMARY OF THE DISCLOSURE

In accordance with the present disclosure, disadvantages and problems associated with limiting access to online accounts to account owners may be reduced or eliminated.

According to one embodiment, a system is provided that includes a memory comprising instructions, an interface, and a processor communicatively coupled to the memory and the interface. The interface is configured to receive, from a first user associated with an online account, a first request to allow access, by a second user not associated with the online account, to the online account, send, in response to the first request, a second request to the second user for credentials, and receive, in response to the second request, credentials from the second user. The process is configured, when executing the instructions, to generate, for the online account based on the first and the credentials received from the second user, an access profile associated with the second user.

According to one embodiment, a method is provided that comprises the steps of receiving, from a first user associated with an online account, a first request to allow access, by a second user not associated with the online account, to the online account, sending, in response to the first request, a second request to the second user for credentials, receiving, in response to the second request, credentials from the second user, and generating, for the online account based on the first and the credentials received from the second user, an access profile associated with the second user.

According to one embodiment, a computer-readable medium comprising instructions is provided. The instructions are configured when executed to receive, from a first user associated with an online account, a first request to allow access, by a second user not associated with the online account, to the online account, send, in response to the first request, a second request to the second user for credentials, receive, in response to the second request, credentials from the second user, and generate, for the online account based on the first and the credentials received from the second user, an access profile associated with the second user.

Technical advantages of certain embodiments of the present disclosure include allowing third parties access to online accounts, which may allow the third parties to act on behalf of the account owner, saving time and resources for the account owner and the company that provides the online account. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which:

FIGS. 3A-3C illustrate an example system for configuring access to online accounts for third parties in accordance with embodiments of the present disclosure.

DETAILED DESCRIPTION

The present disclosure describes systems and methods for configuring access to online accounts for third parties not associated with the online account. For instance, in accordance with the present disclosure, owners of online accounts may be able to setup access profiles for one or more third parties so that each third party may be able to access portions of the online account on behalf of the owner. Based on a request from the account owner, which may include the third party's contact information along with one or more access rules for the third party, the third party may be prompted to enter credentials in order to generate the access profile. The access profile may then be generated using the information in the request from the account owner and the credentials received from the third party.

For example, an elderly or disabled person may wish to allow a child (or some other representative) to access to a financial account to pay bills on their behalf. With typical online accounts, the child may not access the account associated with their parent without the parent's online account credentials. However, the account owner may not wish to allow the child access to every aspect of the financial account. Accordingly, aspects of the present disclosure may allow the account owner to initiate the process of creating an access profile for their child by entering contact information along with one or more access rules for the child into a prompt in the online account, which will generate a request to the child to complete a registration process (e.g., by entering credentials such as a username and password). The online account may then create an access profile for the child based on the access rules entered by the account owner and the credentials entered by the child.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-4, where like numbers are used to indicate like and corresponding parts.

Figure 1:
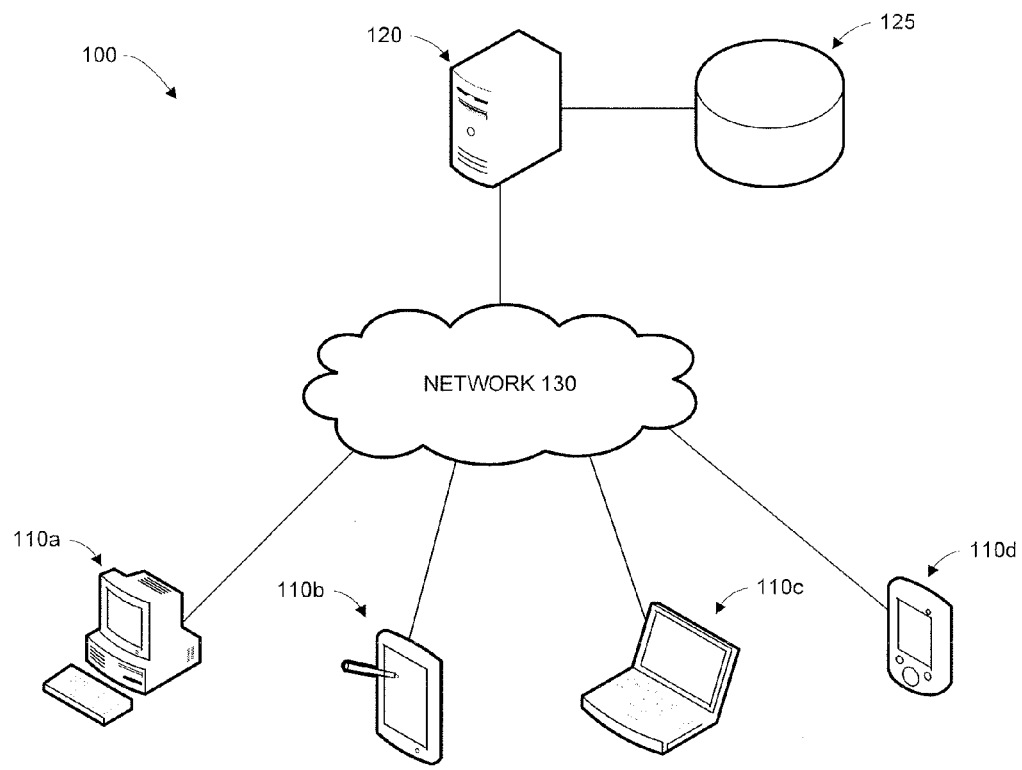
FIG. 1 illustrates an example system comprising user devices accessing a server over a network in accordance with the present disclosure.

FIG. 1 illustrates an example system 100 comprising user devices 110 accessing server 120 over network 130 in accordance with the present disclosure. User devices 110 may include any suitable computing device that may be used to access one or more functions of server 120 through network 130. User devices 110 may include mobile computing devices with wireless network connection capabilities (e.g., wireless-fidelity (WI-FI), and/or BLUETOOTH capabilities). For example, user devices 120 may include laptop computers, smartphones, or tablet computers (such as tablet 110*b*, laptop 110*c*, and smartphone 110). User devices 110 may also include non-mobile devices such as desktop computers (such as desktop 110*a*). In certain embodiments, a number of different user devices 110 may be associated with a particular user. For example, a particular user may own each of desktop computer 110*a*, tablet 110*b*, laptop 110*c*, and smartphone 110*d*, and may use such devices to access the one or more functions of server 120 as described herein.

Server 120 may provide one or more functions accessible to user devices 110, as described herein. For example, server 120 may provide users of user devices 110 access to online banking functions through a website, through a dedicated application installed on the user device 110, or through any other suitable means. In providing functionality to user devices 110, server 120 may access or otherwise utilize database 125.

Network 130 may include any suitable technique for communicably coupling user devices 110 with server 120. For example, network 130 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any combination thereof.

Modifications, additions, or omissions may be made to FIG. 1 without departing from the scope of the present disclosure. For example, FIG. 1 illustrates particular types of user devices 110. However, it will be understood that any suitable type of user device 110 may be used to access the one or more functions provided by server 120. As another example, although illustrated as a single server, server 120 may include a plurality of servers in certain embodiments. Similarly, although illustrated as a single database, database 125 may include a plurality of databases in some embodiments.

Figure 2:
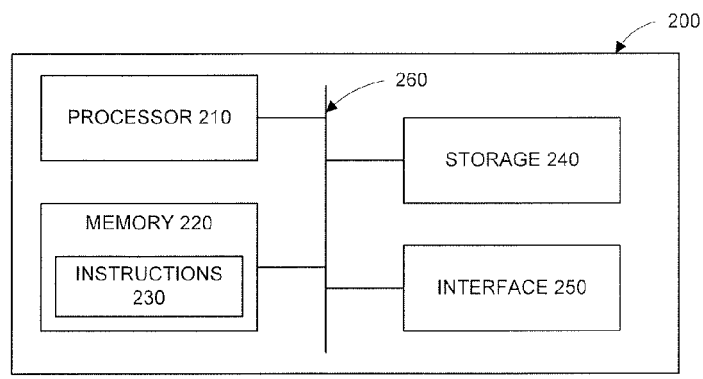
FIG. 2 illustrates an example computer system, in accordance with embodiments of the present disclosure.

FIG. 2 illustrates an example computer system 200, in accordance with embodiments of the present disclosure. One or more aspects of computer system 200 may be used in user devices 110 or server 120 of FIG. 1. For example, each of user devices 110 or server 120 may include a computer system 200 in some embodiments. As another example, each of user devices 110 or server 120 may include two or more computer systems 200 in some embodiments.

Computer system 200 may include a processor 210, memory 220 comprising instructions 230, storage 240, interface 250, and bus 260. These components may work together to perform one or more steps of one or more methods (e.g. method 500 of FIG. 5) and provide the functionality described herein. For example, in particular embodiments, instructions 230 in memory 220 may be executed on processor 210 in order to process requests received by interface 250 using common function modules. In certain embodiments, instructions 230 may reside in storage 240 instead of, or in addition to, memory 220.

Processor 210 may be a microprocessor, controller, application specific integrated circuit (ASIC), or any other suitable device or logic operable to provide, either alone or in conjunction with other components (e.g., memory 220 and instructions 230) functionality according to the present disclosure. Such functionality may include processing application functions using remotely-located common function modules, as discussed herein. In particular embodiments, processor 210 may include hardware for executing instructions 230, such as those making up a computer program or application. As an example and not by way of limitation, to execute instructions 230, processor 210 may retrieve (or fetch) instructions 230 from an internal register, an internal cache, memory 220, or storage 240; decode and execute them; and then write one or more results of the execution to an internal register, an internal cache, memory 220, or storage 240.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer system 200, including software (e.g., instructions 230) embedded in a computer readable medium, and/or encoded logic incorporated in hardware or otherwise stored (e.g., firmware). In particular embodiments, memory 220 may include main memory for storing instructions 230 for processor 210 to execute or data for processor 210 to operate on. In particular embodiments, one or more memory management units (MMUs) may reside between processor 210 and memory 220 and facilitate accesses to memory 220 requested by processor 210.

Storage 240 may include mass storage for data or instructions (e.g., instructions 230). As an example and not by way of limitation, storage 240 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 240 may include removable or non-removable (or fixed) media, where appropriate. Storage 240 may be internal or external to computer system 200, where appropriate. In some embodiments, instructions 230 may be encoded in storage 240 in addition to, in lieu of, memory 220.

Interface 250 may include hardware, encoded software, or both providing one or more interfaces for communication (such as, for example, packet-based communication) between computer systems on a network (e.g., between employee devices 110 and back-end 130 of FIG. 1). As an example, and not by way of limitation, interface 250 may include a network interface controller (NIC) or network adapter for communicating with an Ethernet or other wire-based network and/or a wireless NIC (WNIC) or wireless adapter for communicating with a wireless network. Interface 250 may include one or more connectors for communicating traffic (e.g., IP packets) via a bridge card. Depending on the embodiment, interface 250 may be any type of interface suitable for any type of network in which computer system 200 is used. In some embodiments, interface 250 may include one or more interfaces for one or more I/O devices. One or more of these I/O devices may enable communication between a person and computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 260 may include any combination of hardware, software embedded in a computer readable medium, and/or encoded logic incorporated in hardware or otherwise stored (e.g., firmware) to communicably couple components of computer system 200 to each other. As an example and not by way of limitation, bus 260 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 260 may include any number, type, and/or configuration of buses 260, where appropriate. In particular embodiments, one or more buses 260 (which may each include an address bus and a data bus) may couple processor 210 to memory 220. Bus 260 may include one or more memory buses.

Modifications, additions, or omissions may be made to FIG. 2 without departing from the scope of the present disclosure. For example, FIG. 2 illustrates components of computer system 200 in a particular configuration. However, any configuration of processor 210, memory 220, instructions 230, storage 240, interface 250, and bus 260 may be used, including the use of multiple processors 210 and/or buses 260. In addition, computer system 200 may be physical or virtual.

Figure 3A:
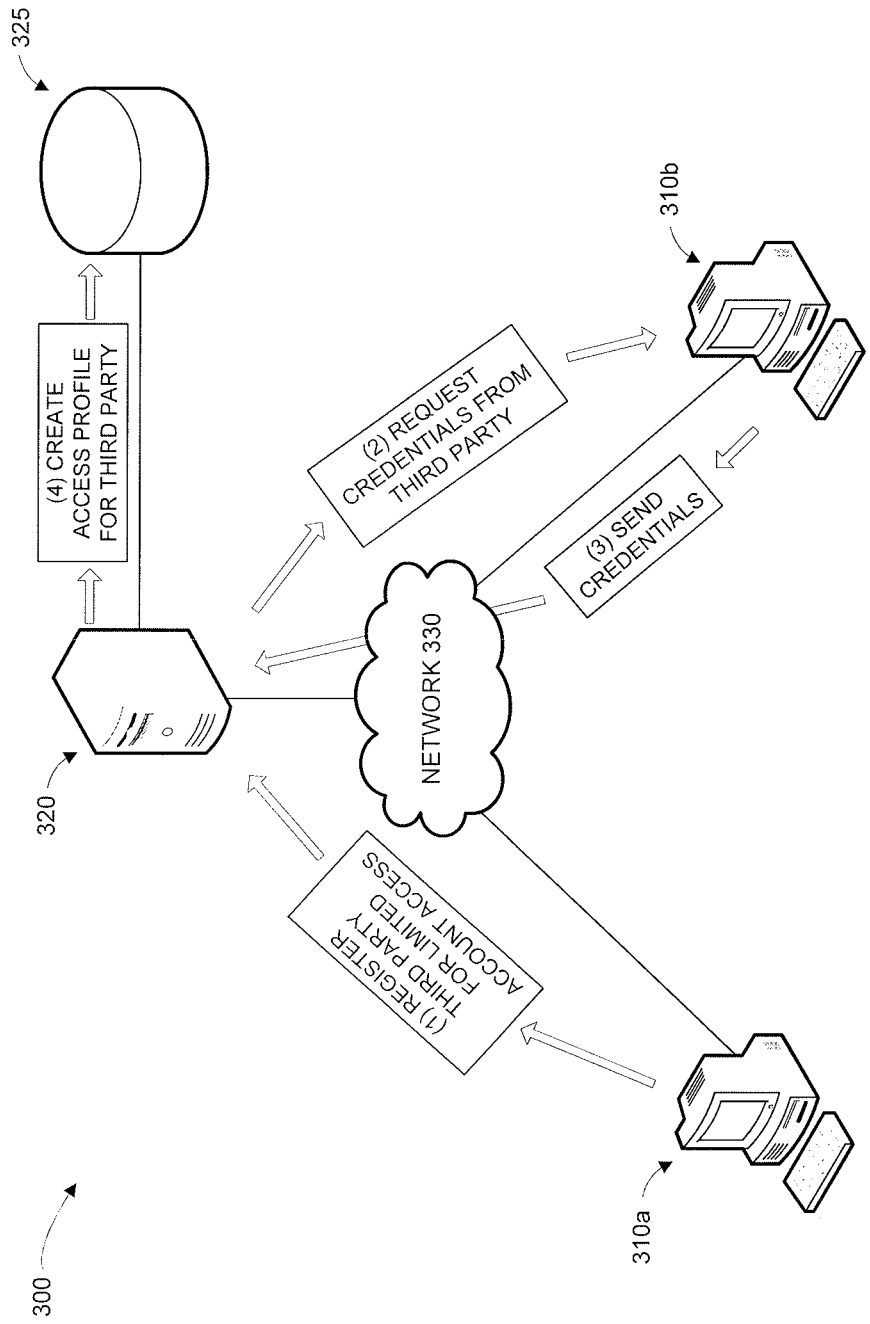

FIGS. 3A-3C illustrate an example system 300 for configuring access to online accounts for third parties in accordance with embodiments of the present disclosure. System 300 comprises a user device 310a that is associated with an owner (or authorized user) of an online account that is hosted or otherwise serviced by server 320. Server 320 may use database 325 to store any suitable information associated with the online account. System 300 further comprises a user device 310b that is associated with a third party, where the third party is not associated with the online account (e.g., is not an owner or authorized user of the online account).

In operation, the account owner, from user device 310a, may access the online account using server 320 and register the third party for limited account access. This may include configuring one or more access rules for the third party. For example, the account owner may select one or more types of information that the third party may access in the online account and/or one or more functions associated with the online account that the third party may perform. In one embodiment, as described further below with respect to FIGS. 3B-3C, a third party may be allowed by the account owner to pay bills with a checking account, but not be able to view details for, or perform actions related to, other accounts that the account owner may have.

Server 320 may then send a request to user device 310b associated with the third party. This may include a request that the third party setup or enter credentials for use with a new online account access profile that will be created for their use. In some embodiments, the request may include a link for the user to click on to be redirected to a prompt for the credentials. The request may be sent based on contact information entered by the account owner in the initial registration process. For example, the request to user device 310b may be sent as an electronic mail message or short message system (SMS) text message that includes a link and a description of the request to enter credentials to access the online account. When clicked on at user device 310b, the third party may be directed to a website hosted by server 320 at which she may enter desired credential information (e.g., a username and password combination). The third party may enter such credential information, at which time server 320 may create an access profile for the third party based on the credentials and the access rules entered by the account owner. Accordingly, the third party may access, using her own credentials, the information or functions for the online account that have been designated as accessible by the account owner. However, the third party may not be able to access all information or account functions, such as those that the account owner has designated as restricted.

FIGS. 3B-3C illustrate example user interfaces 311 and 312 of user devices 310a and 310b, respectively, accessing the same online account serviced by server 320 of FIG. 3A. In particular, user interface 311 and user interface 312 show example information and functions accessible to the account owner and the third party, respectively. As shown in user interface 311, the account owner may be able to view balance and transaction information for each of her financial accounts. The account owner may also be able to pay bills, pay toward a credit card, or transfer money between her accounts. As shown in user interface 312, however, the third party may only be able to pay bills, pay toward a credit card, and view checking and credit card balances on behalf of the account owner, and may not be able to view balance or transaction information for each financial account owned by the account owner.

Modifications, additions, or omissions may be made to FIGS. 3A-3C without departing from the scope of the present disclosure. For example, FIGS. 3A-3C illustrate particular types of user devices 310 configuring access to online accounts for third parties using server 320. However, it will be understood that any suitable type of user device 310 may be used to configure access to online accounts for third parties server 320. As another example, although illustrated as a single server, server 320 may include a plurality of servers in certain embodiments. Similarly, although illustrated as a single database, database 325 may include a plurality of databases in some embodiments. Furthermore, although described as configuring access to a single online account for a single third party, it will be understood that system 300 may configure access online accounts for any suitable number of third parties or online accounts.

Figure 4:
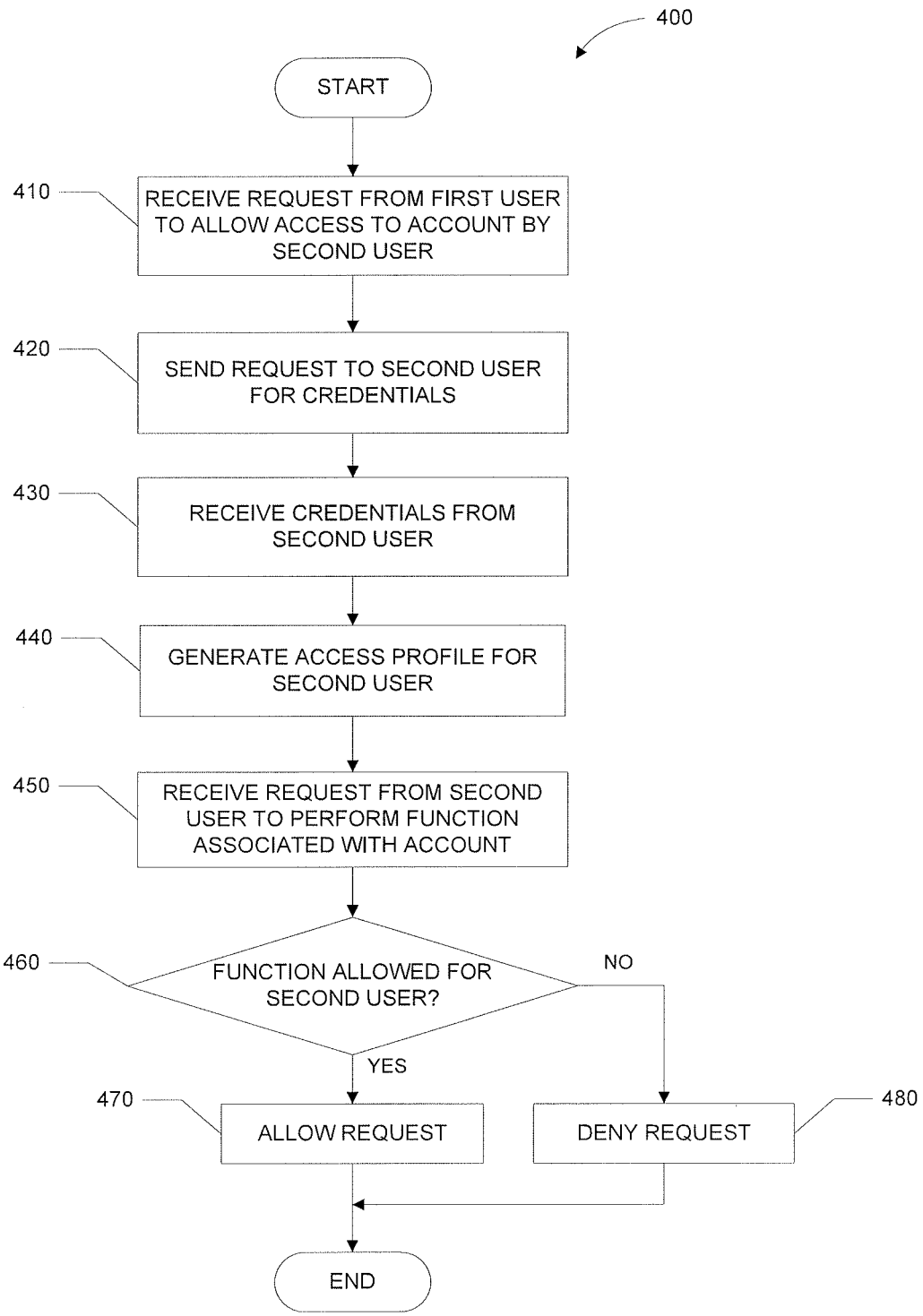
FIG. 4 illustrates an example method for configuring access to online accounts for third parties in accordance with embodiments of the present disclosure.

FIG. 4 illustrates an example method 400 for configuring access to online accounts for third parties in accordance with embodiments of the present disclosure. The method begins at step 410, where a first request is received at a server (e.g., server 320 of FIG. 3A) from a first user associated with an online account (e.g., from user device 310a of FIG. 3A), which requests to allow access by a second user not associated with the online account to the online account. The first user may be an owner of the online account or any other suitable authorized user with full access to the online account, while the second user may be any user that is not associated with the online account. The first request may be received through a web-based form, in certain embodiments, and may be in any suitable format, such as hypertext transport protocol (HTTP) format or extensible markup language (XML) format. The first request may include one or more access rules associated with the second user in particular embodiments. For instance, the access rules may indicate one or more of a plurality of functions associated with the online account or types of information associated with the online account that the second user may access. In some embodiments, the first request contains contact information for the second user, which may include, for example, an electronic mail address or a phone number.

At step 420 a second request for credentials is sent by the server to the second user (e.g., to user device 310*b* of FIG. 3A) in response to the first request being received at the server. The second request may be in any suitable format, such as an electronic mail message or SMS message, and may be sent to a contact address entered by the first user in the first request. In particular embodiments, the second request may include a link configured to direct the second user to a prompt for the credentials. For instance, an SMS message may be sent to the second user that includes a link to a web-based form at which the second user may enter suitable information to setup online account access credentials.

At step 430, the credentials are received at the server from the second user, and at step 440, an access profile is generated by the server that is associated with the second user. The access profile may then be stored in a database associated with the server (e.g., database 325 of FIG. 3A). The access profile may be generated based on the one or more access rules entered by the first user in the first request at step 410 and the credentials sent by the second user at step 430. Accordingly, using the generated access profile, the second user may then be able to access certain information or functions associated with the online account.

Later, at step 450, a third request to perform a function associated with the online account is received at the server. The third request may be received from a user device associated with the second user (e.g., user device 310*b* of FIG. 3A). As an example, the request may include a request to view information associated with the online account (e.g., balance information for a financial account) and/or a request to perform a particular account function (e.g., transfer money to or from a financial account). At step 460, it is determined whether the account function is allowed to be performed by the second user, which may be determined based on the access profile generated in step 440 (e.g., determined by credentials or the access rules for the second user). If the function is allowed to be performed by the second user, then the request is allowed at step 470. If the function is not allowed to be performed by the second user, then the request is denied at step 470.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system, comprising:
a memory comprising instructions;
an interface configured to:
receive, from a first user associated with an online account, a first request to allow access, by a second user not associated with the online account, to the online account, wherein:
the first request indicates one or more access rules associated with the second user,
the access rules indicate one or more of a plurality of functions that are associated with the online account that the second user may access, and
the access rules indicate one or more types of information associated with the online account that the second user may access;
send, in response to the first request, a second request to the second user for credentials; and
receive, in response to the second request, credentials from the second user; and
a processor communicatively coupled to the memory and the interface, the processor configured, when executing the instructions, to:
generate, for the online account based on the first request and the credentials received from the second user, an access profile associated with the second user,
modify a user interface for the online account based on the access profile to display the one or more functions that are associated with the online account that the second user may access and the one or more types of information associated with the online account that the second user may access,
receive, from the second user, a third request to perform a function associated with the online account,
verify the access profile associated with the second user;
allow the third request to perform the function associated with the online account when the access profile satisfies the access rules; and
deny the third request to perform the function associated with the online account when the access profile does not satisfy the access rules.

2. The system of claim 1, wherein the first request contains contact information for the second user.

3. The system of claim 1, wherein the second request comprises a link configured to direct the second user to a prompt for the credentials.

4. A method, comprising:
receiving, from a first user associated with an online account, a first request to allow access, by a second user not associated with the online account, to the online account, wherein:
the first request indicates one or more access rules associated with the second user,
the access rules indicate one or more of a plurality of functions that are associated with the online account that the second user may access, and
the access rules indicate one or more types of information associated with the online account that the second user may access;
sending, in response to the first request, a second request to the second user for credentials;
receiving, in response to the second request, credentials from the second user;
generating, for the online account based on the first request and the credentials received from the second user, an access profile associated with the second user;
modifying a user interface for the online account based on the access profile to display the one or more functions that are associated with the online account that the second user may access and the one or more types of information associated with the online account that the second user may access;
receiving, from the second user, a third request to perform a function associated with the online account;

verifying the access profile associated with the second user;

allowing the third request to perform the function associated with the online account when the access profile satisfies the access rules; and denying the third request to perform the function associated with the online account when the access profile does not satisfy the access rules.

5. The method of claim 4, wherein the first request contains contact information for the second user.

6. The method of claim 4, wherein the second request comprises a link configured to direct the second user to a prompt for the credentials.

7. A computer-readable medium comprising instructions that are configured, when executed by a processor, to:

receive, from a first user associated with an online account, a first request to allow access, by a second user not associated with the online account, to the online account, wherein:

the first request indicates one or more access rules associated with the second user, the access rules indicate one or more of a plurality of functions that are associated with the online account that the second user may access, and the access rules indicate one or more types of information associated with the online account that the second user may access;

send, in response to the first request, a second request to the second user for credentials;

receive, in response to the second request, credentials from the second user;

generate, for the online account based on the first request and the credentials received from the second user, an access profile associated with the second user;

modify a user interface for the online account based on the access profile to display the one or more functions that are associated with the online account that the second user may access and the one or more types of information associated with the online account that the second user may access;

receive, from the second user, a third request to perform a function associated with the online account;

verify the access profile associated with the second user;

allow the third request to perform the function associated with the online account when the access profile satisfies the access rules; and deny the third request to perform the function associated with the online account when the access profile does not satisfy the access rules.

8. The computer-readable medium of claim 7, wherein the first request contains contact information for the second user.

9. The computer-readable medium of claim 7, wherein the second request comprises a link configured to direct the second user to a prompt for the credentials.

\* \* \* \* \*